(12) United States Patent
Keller

(10) Patent No.: US 6,225,706 B1
(45) Date of Patent: May 1, 2001

(54) METHOD FOR THE ISOTHERMAL COMPRESSION OF A COMPRESSIBLE MEDIUM, AND ATOMIZATION DEVICE AND NOZZLE ARRANGEMENT FOR CARRYING OUT THE METHOD

(75) Inventor: Jakob Keller, deceased, late of Wohlen (CH), by Maria Keller-Schärli, Vera Keller and Georg Keller, administrators

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/405,228

(22) Filed: Sep. 27, 1999

(30) Foreign Application Priority Data

Sep. 30, 1998 (EP) .................................................. 98810982

(51) Int. Cl.[7] .............................. F03B 13/00; H02P 9/04
(52) U.S. Cl. ........................... 290/54; 290/1 R; 290/1 A; 290/1 B
(58) Field of Search .................................... 290/1 B, 1 C, 290/2, 54; 417/54, 179

(56) References Cited

U.S. PATENT DOCUMENTS

| | | | | |
|---|---|---|---|---|
| 4,281,511 | * | 8/1981 | Neale ................................ | 60/39.53 |
| 4,379,679 | | 4/1983 | Guile .................................... | 60/39 |
| 4,478,553 | * | 10/1984 | Leibowitz et al. ............... | 416/97 R |
| 4,797,563 | | 1/1989 | Richardson ........................ | 60/39 |
| 5,083,429 | | 1/1992 | Veres et al. ........................ | 60/39 |
| 5,537,813 | | 7/1996 | Davis et al. ....................... | 60/39 |
| 5,638,684 | * | 6/1997 | Siegel et al. ...................... | 62/6 |
| 5,713,210 | * | 2/1998 | Jirnov et al. ...................... | 62/87 |

FOREIGN PATENT DOCUMENTS

| | | |
|---|---|---|
| 0477845A1 | 4/1992 | (EP) . |
| 519.857 | 6/1921 | (FR) . |
| 391619 | 5/1933 | (GB) . |

OTHER PUBLICATIONS

"Thermodynamic analysis of hydraulic air compressor–gas turbine power plants", Bidini, et al., Proc. Istn. Mech. Engrs., vol. 211, Part A, 1997, pp. 429–437.

* cited by examiner

*Primary Examiner*—Elvin Enad
(74) *Attorney, Agent, or Firm*—Burns, Doane, Swecker & Mathis, L.L.P.

(57) ABSTRACT

A method and a device for the isothermal compression of a compressible medium preferably air, for the operation of a turbomachine which is intended to generate energy and in which a pressurized liquid, preferably water, is atomized by means of an atomization device and, together with the air, forms a liquid-air mixture which, in order to be compressed, is introduced into a nozzle arrangement in which most of the kinetic energy of the liquid-air mixture is converted into compression energy as a result of an increase in the pressure of the air. The liquid-air mixture is introduced into the nozzle arrangement at a velocity which is greater than the speed of sound, and the atomization is carried out in such a manner that liquid droplets are formed within the liquid-air mixture, the diameters of which droplets are approximately 200 $\mu m$ or less.

21 Claims, 6 Drawing Sheets

Fig. 2         a)                              b)

Figure 1:
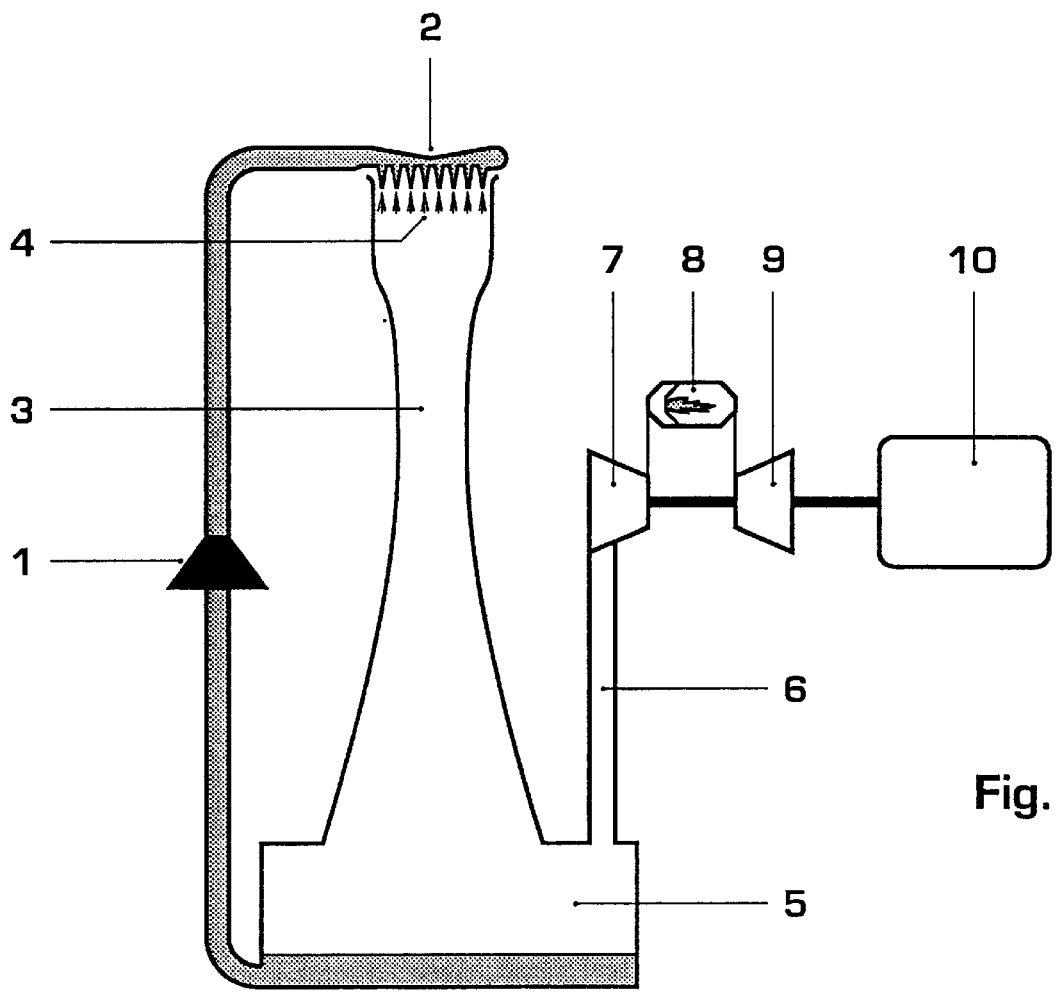

| | | | | | |
|---|---|---|---|---|---|
| IP | 98'100 | (Pa) | | 98'100 | |
| DD | 5,00E-05 | (m) | | 2,00E-04 | |
| TW | 15 | (C) | | 15 | |
| DW | 1000 | (kg/m³) | | 1000 | |
| A | 9,81 | m/s² | | 9,81 | |
| G | 287 | m²/s² K | | 287 | |
| MA | 1 | (kg/s) | | 1 | |
| MW | 36 | (kg/s) | | 100 | |
| IS | 100 | (m/s) | | 150 | |
| E | 97,5 | (%) | | 95 | |

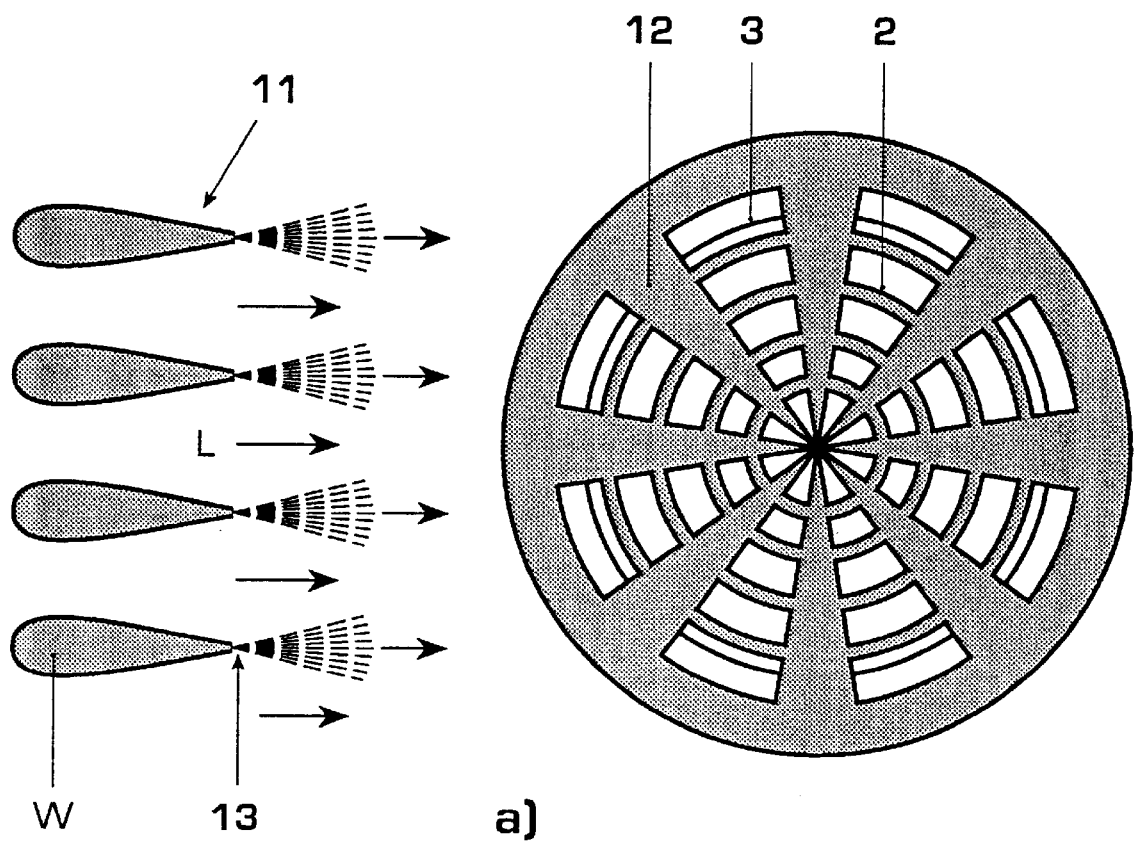
a)
Fig. 4
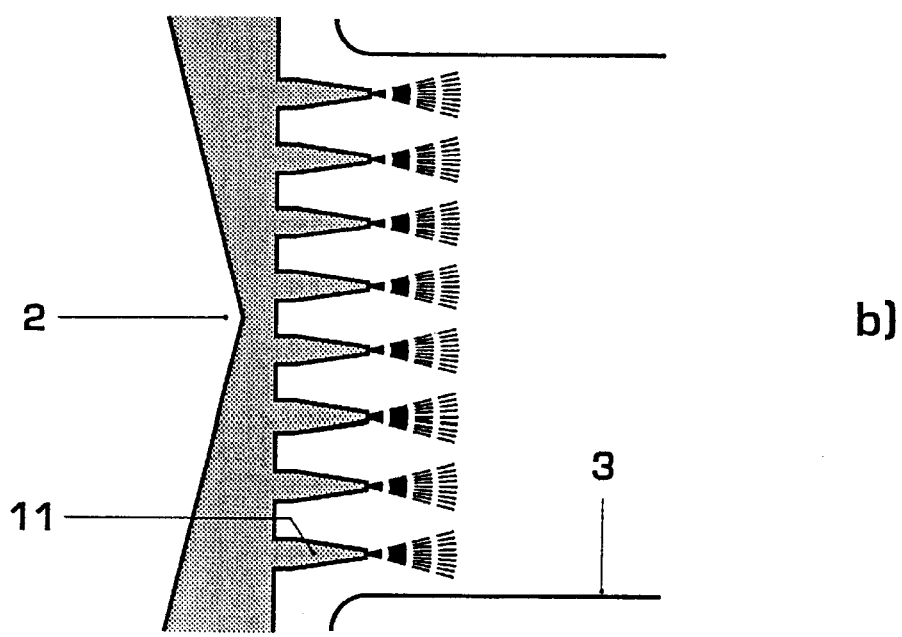
b)

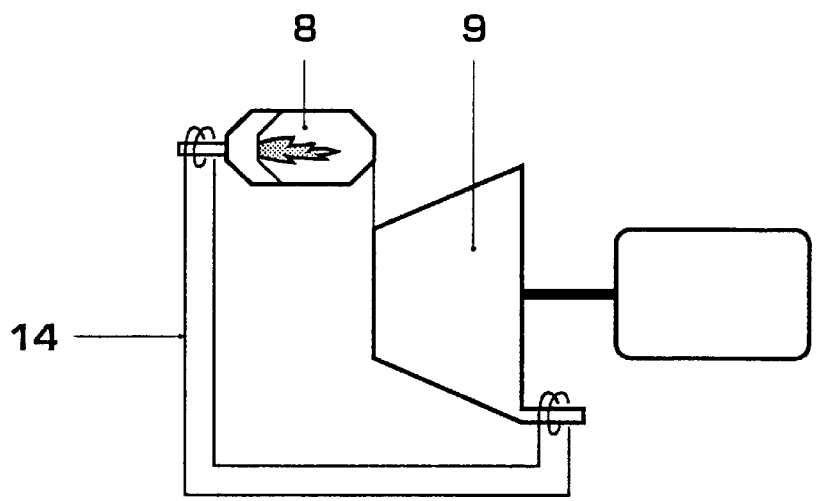
Fig. 5
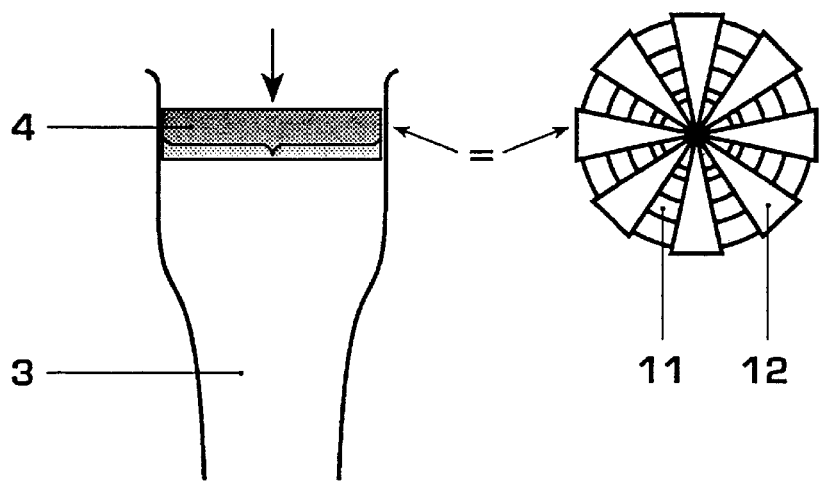
Fig. 6
| | | |
|---|---|---:|
| IP | (Pa) | 100'000 |
| BD | (m) | 1,00E-02 |
| TW | (C) | 40 |
| DW | (kg/m³) | 1'000 |
| A | m/s² | 9,81 |
| G | m²/s² K | 287 |
| MA | (kg/s) | 1 |
| MW | (kg/s) | 100 |
| IS | (m/s) | 100 |
| HC | (m) | 25 |
| E | (%) | 97,5 |
Fig. 7

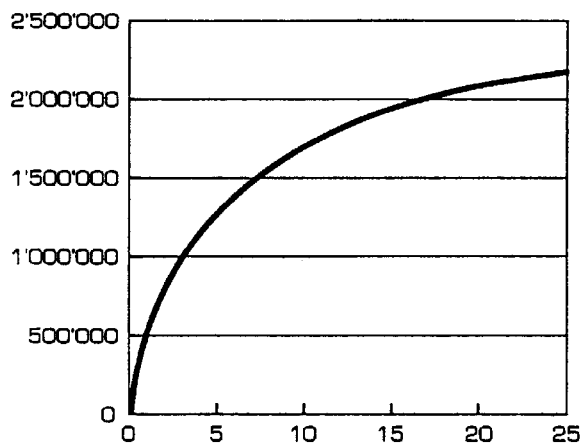
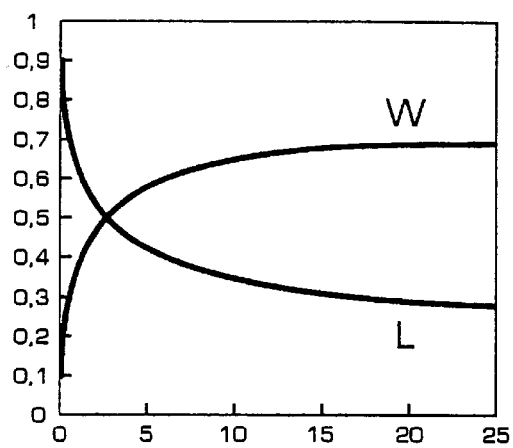
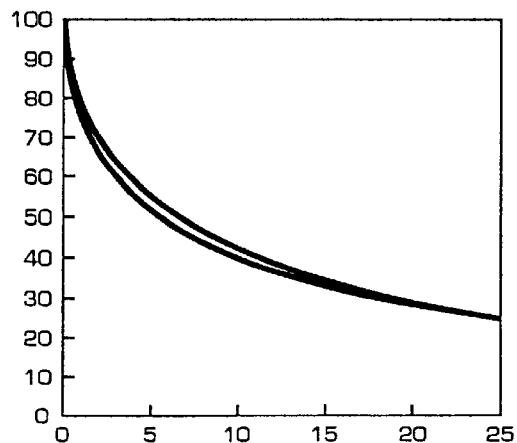
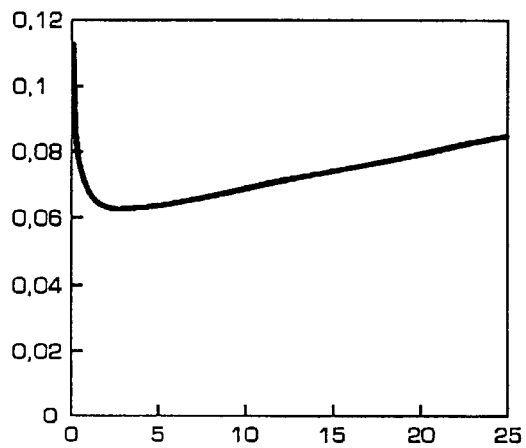
Fig. 8

METHOD FOR THE ISOTHERMAL COMPRESSION OF A COMPRESSIBLE MEDIUM, AND ATOMIZATION DEVICE AND NOZZLE ARRANGEMENT FOR CARRYING OUT THE METHOD

BACKGROUND OF THE INVENTION

1. Field of the Invention

The invention relates to a method for the isothermal compression of a compressible medium, preferably air, for the operation of a turbomachine which is intended to generate energy and in which a pressurized liquid, preferably water, is atomized by means of an atomization device and, together with the air, forms a liquid-air mixture which, in order to be compressed, is introduced into a nozzle arrangement in which most of the kinetic energy of the liquid-air mixture is converted into compression energy as a result of the pressure of the air increasing. The invention furthermore describes an atomization device and a nozzle arrangement.

2. Discussion of Background

To produce energy, it is proposed, in U.S. Pat. No. 4,797,563, to supply a gas turbine with isothermally precompressed air which is accelerated along a descending gradient, which is designed as a horizontal chute, as a liquid-air mixture, by means of the force of gravity and is compressed in a pressure chamber which adjoins the bottom end of the chute, where the air is separated from the liquid again. The air which has been compressed in this way is then fed to the combustion chamber of a gas turbine, within which the highly compressed air which is at a low temperature level is mixed with fuel and ignited. The principal advantages of the isothermal compression are, firstly, the fact that there is no need for conventional compressor stages which are driven by the gas turbine and consequently impair the efficiency of the overall gas-turbine plant, and secondly the fact that the precompressed air, which is at a relatively low temperature, is able to impose considerably lower thermal loads on the components of the plant which come into thermal contact with this air, with the result that the requirements imposed in the individual components of the plant can be reduced.

The principle of isothermal compression, which is known per se and is described in the abovementioned U.S. Pat. No. 4,797,563, is an interesting possibility which appears to point the way forward for providing air to gas turbine plants in precompressed form, and consequently it is desirable to optimize this technology. In particular, the efficiency of compressor arrangements of this nature is to be increased, in order in this way to improve the overall efficiency of energy-producing plants, and in this case, in particular, gas-turbine plants.

SUMMARY OF THE INVENTION

Accordingly, one object of the invention is to refine a method for the isothermal compression of a compressible medium, preferably air, for the operation of a turbomachine which is intended to generate energy and in which a pressurized liquid, preferably water, is atomized by means of an atomization device and, together with the air, forms a liquid-air mixture which, in order to be compressed, is introduced into a nozzle arrangement in which most of the kinetic energy of the liquid-air mixture is converted into compression energy as a result of the pressure of the air increasing, in such a manner that, on the one hand, the compression efficiency is to be increased, the intention being that the plant components which are required for this purpose are to be produced in as inexpensive and compact a manner as possible, i.e. in the smallest possible structural form. Moreover, the plant components which are required to carry out the desired method, in particular the atomization device which is required to produce a liquid-air mixture and the nozzle arrangement which is provided for compression, are to be modified with a view to the desired optimization of the compression efficiency.

Working on the basis of a large number of experiments carried out in the run-up to the invention, the invention is based on the principle that, by suitably setting the droplet size or bubble size and velocity of the liquid-air mixture, it is possible to have a decisive influence on the compression efficiency which can be achieved with a compressor arrangement, for example with a Laval nozzle.

According to the invention, a method is refined in such a manner that the liquid-air mixture is introduced into the nozzle arrangement at a velocity which is greater than the speed of sound, and within the nozzle arrangement it is decelerated from the trans-sonic range into the subsonic range and, at the same time, a desired pressure increase takes place. The atomization of the liquid before it enters the nozzle arrangement takes place inside the atomization device, in such a manner that liquid droplets with a diameter of approx. 200 $\mu$m and less are formed within the liquid-air mixture. It has been recognized that, in order to form the liquid-air mixture which is as homogenous as possible, the liquid stream which is to be atomized has to be fed to the atomization device at high pressure, so that the exit speed of the liquid leaving the atomization device is approximately 100 to 200 m/sec. As the pressure increases and/or the percentage of liquid by volume increases, the cloud of droplets changes into a liquid containing bubbles. Since the relative velocity of the two phases is considerably reduced after this transition, owing to the increased resistance to relative movement, the fineness of the mixture is particularly important only in the initial phase of the cloud of droplets.

According to the invention, it has been recognized that liquid atomization using the abovementioned high exit velocities and a liquid-droplet formation with droplet diameters which are as small as possible, result in the formation of a liquid-air mixture which, when it passes through a Laval nozzle, undergoes considerably better compression than is the case for liquid-air mixtures with lower flow velocities and greater droplet diameters, according to the prior art known hitherto. It is thus possible, depending on the quality and efficiency of the atomization operation, to have a decisive influence on the length of the Laval nozzle which is required for the compression. Put simply, it is possible to state that the more homogenous a liquid-air mixture, comprising liquid droplets with diameters which are as small as possible, and the greater the flow velocity of the mixture, the shorter it is possible for the length of the Laval nozzle to become. Thus a large number of flow investigations have shown that the deceleration action of the liquid-air mixture which enters the Laval nozzle is at its height in the first half of the total length of the Laval nozzle, provided that the liquid-air mixture moves past the Laval nozzle at a high speed, with a droplet distribution which is as homogenous as possible and with droplets with a very small diameter. Working on this basis, it is possible to reduce the structural size of Laval nozzles considerably.

In order to increase the atomization produced by the atomizer device, i.e. reduce the diameter of the liquid droplets and to set the droplet distribution to be as homogenous as possible within the liquid-air mixture which forms, it is particularly advantageous if the high-pressure liquid which is fed to the atomizer device is at a temperature which, under the pressure conditions prevailing during the atomization operation, lies just above the evaporation temperature of the liquid. This ensures that, in addition to the atomization effect which is produced by the atomization device, the liquid droplets, after they have passed through the atomizer nozzle, are additionally subjected to an evaporation process, which contributes to reducing the diameter of the droplets further. Briefly exceeding the boiling point leads to particularly small droplets. However, it is very much dependent on the overall process of the power plant whether it is possible, from a thermodynamic viewpoint, to select such an atomization temperature.

A further possibility of optimizing the atomization operation is to admix a second liquid with the liquid which is to be atomized before it passes through the atomizer device. In this case, the second liquid is to be admixed to the liquid to be atomized under the pressure and temperature conditions before atomization, so that the triple point of the second liquid is not exceeded. Preferably, liquefied $CO_2$, which is in the liquid phase under pressure conditions of >10, preferably >70 bar and temperatures of less than 35° C., is suitable as the second liquid which is to be admixed. After the liquid mixture has passed through the atomization device, the pressure falls suddenly due to the expansion, with the result that the triple point is exceeded and the second liquid sublimes into its gaseous phase. As a result, the atomized liquid-air mixture, in addition to the atomization effect brought about by the atomization device, experiences further break-up of each individual liquid drop into smaller droplets, resulting in the desired droplet diameter of <200 μm.

A particularly advantageous combination of this compression technique with the operation of gas-turbine plants makes it possible to admix the combustion gases which are formed during the combustion process of the gas-turbine plants, in particular carbon dioxide, with the liquid which is to be atomized before it passes through the atomization device, in the manner described above, with the result that it is possible to considerably increase the efficiency of the overall gas-turbine plant.

Furthermore, it has been recognized, according to the invention, that a significant conversion of the kinetic energy which is contained in the liquid-air mixture which passes through the atomization device at high pressure and high speed, results in an increase in the pressure of the compressible air, provided that the liquid-air mixture is of foam-like consistency, i.e. contains air bubbles which are enclosed by liquid. The foam-like liquid-air mixture emerging from the atomization device enters the Laval nozzle at supersonic speed, and in this nozzle the mixture is decelerated, within a relatively short distance along the Laval nozzle, to speeds which lie in the subsonic range. For example, air bubbles with a diameter of up to 25 mm are suitable for passing through a Laval nozzle in which the air bubbles, which enter at supersonic speed, are decelerated to subsonic speed within the first few meters of the Laval nozzle and are compressed most effectively in this area. Thus, virtually the entire conversion of the kinetic energy of the liquid-air mixture into compression work takes place within the first 2 to 3 meters of the Laval nozzle. After speeds which lie below the speed of sound have been reached, the Laval nozzle has only little success in compressing the mixture further, for which reason it is recommended to shorten the entire Laval nozzle arrangement.

In order to produce a liquid-gas mixture in the form of the two alternatives mentioned above, i.e. to form an aerosol comprising extremely small, homogeneously dispersed liquid droplets, and to form a foam-like mixture in which air bubbles are surrounded by liquid, an atomization device is designed, according to the invention, in such a manner that at least one annular nozzle is provided or at least one annular nozzle is arranged concentrically around a central nozzle and at a distance therefrom. Furthermore, the central nozzle and the annular nozzle are connected to one another via at least one radial connection passage, in order to exchange a stream of matter.

In the case of producing a liquid-air mixture which comprises extremely finely dispersed liquid droplets, the central nozzle and the annular nozzle are fed, via a suitable feed line, with high-pressure liquid which is substantially homogeneously mixed, in the form of extremely small liquid drops, with the air which is fed through the space between central nozzle and annular nozzle.

In the case of producing a foam-like mixture in which air bubbles are surrounded by the liquid, the central nozzle and the annular nozzle are fed, via a suitable feed line, with feed air which leaves through the corresponding nozzle openings. In this case, liquid flows around the central nozzle and the annular nozzle, so that air bubbles are formed within the supplied liquid flowing around the nozzle arrangement.

Depending on the size of the area of the liquid-air mixture which is to be produced, a multiplicity of annular nozzles are provided in a concentric arrangement around the central nozzle. The surface area which is covered by the nozzle arrangement generally corresponds to the inlet opening of the Laval nozzle in which the liquid-air mixture is decelerated in a controlled manner.

Particularly when decelerating the abovementioned foam-like liquid-air mixture, the Laval nozzle, in the area of its narrowest internal flow diameter, provides a bypass opening, the width of which can be controlled and through which some of the foam-like liquid-air mixture can escape. As a result, the mixture which enters the Laval nozzle at supersonic speed can be decelerated in a more controlled manner. The bypass opening serves as a start-up aid. In this way, it is possible to ensure that a supersonic flow is in fact established upstream of the Laval nozzle.

Furthermore, it is advantageous, in order to improve compression of the air bubbles, which expand inside the Laval nozzle after the velocity has fallen below the speed of sound, if a bleed-valve arrangement which has an effect on the static pressure within the Laval nozzle is provided in the area of the narrowest diameter of the nozzle. This measure is also to be understood as a start-up aid. The intention is to ensure that the flow does not change back into a supersonic flow after the constriction. These measures are comparable to the measures which have to be taken into account when commissioning a supersonic passage.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, which do not represent any limitation to the general concept of the invention and in which:

FIG. 1 shows a diagrammatic illustration of a gas-turbine plant with upstream isothermal compression, FIGS. 2a), b) show tables summarizing physical operating parameters for the atomization of water in an atomization device for the case of two different flow velocities of water when it emerges from the atomization device, namely 100 m per second (case a) and 150 m per second (case b).

Figure 3:
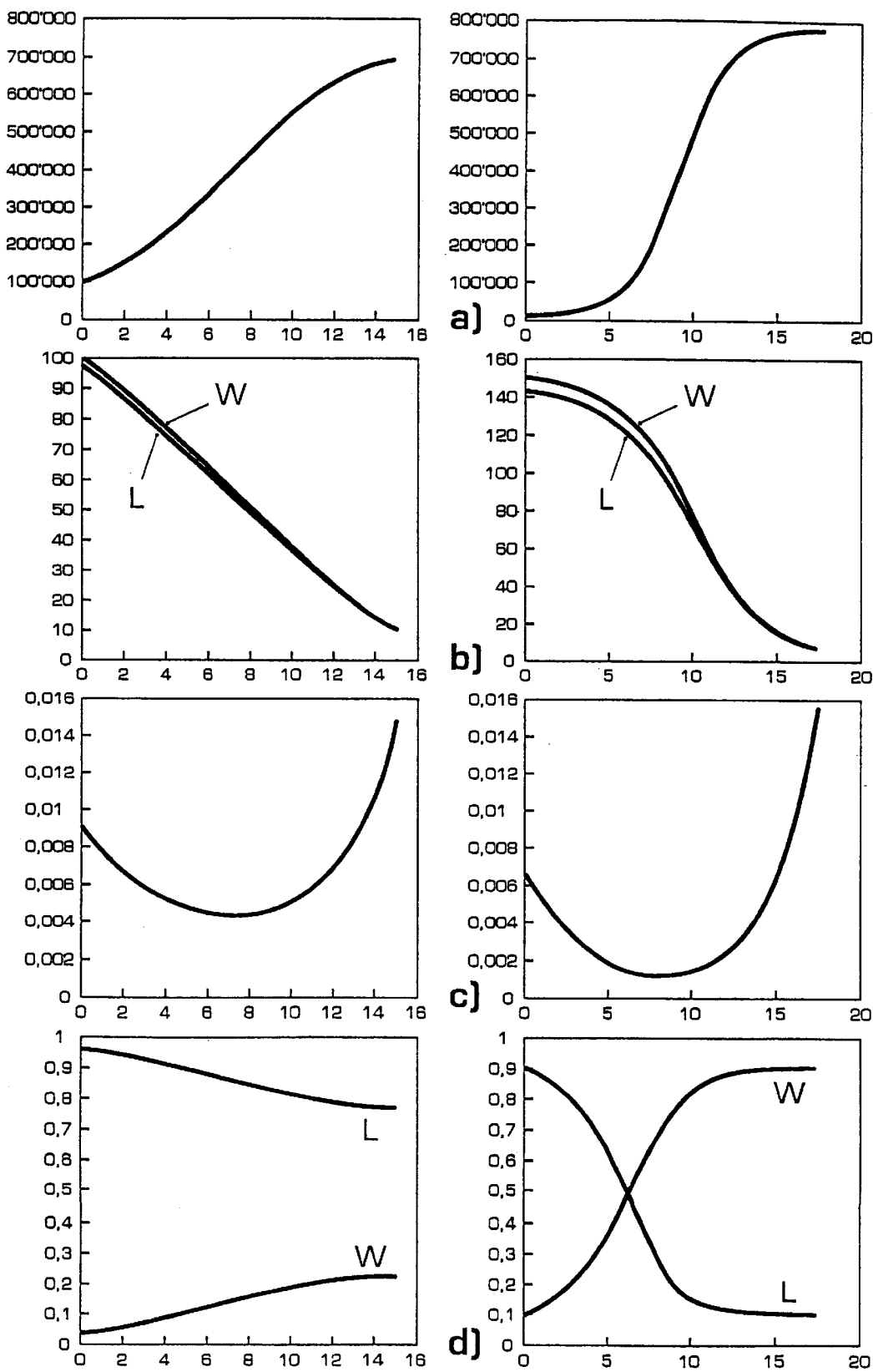
Figure 9:
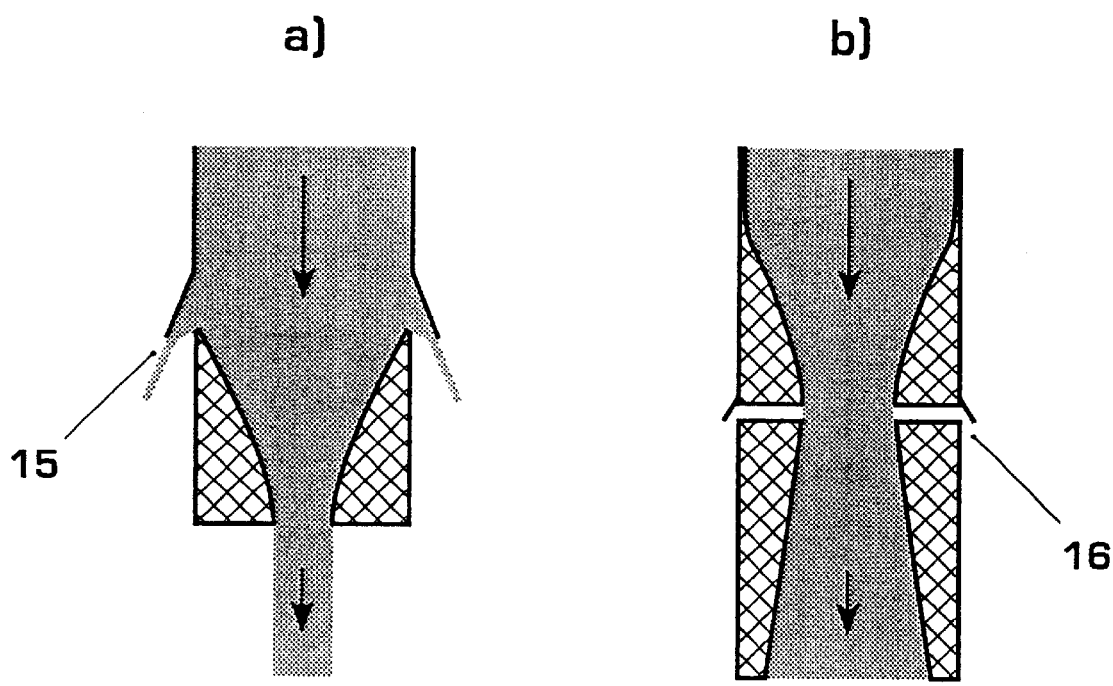
Figure 10:
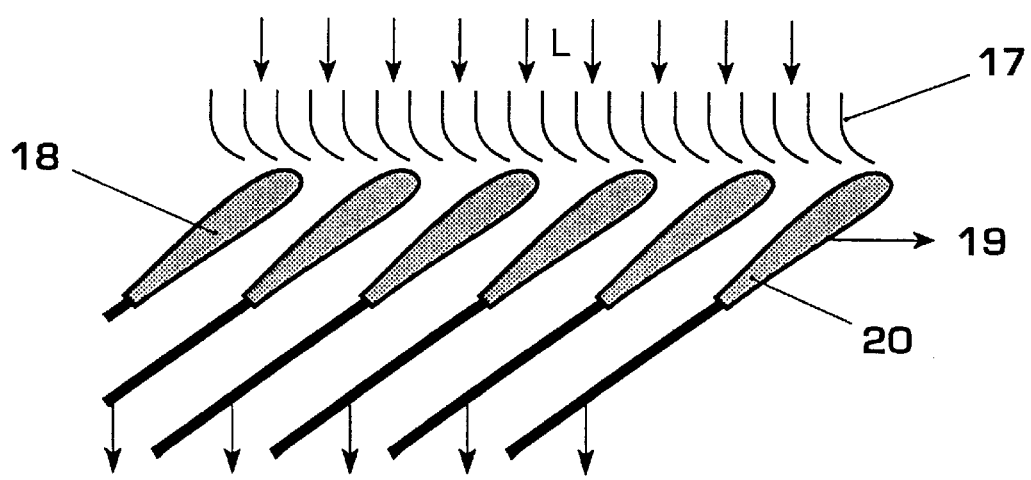

FIGS. 3a, b, c, d show a comparison of physical measured variables for the atomizations with different outlet velocities carried out in FIGS. 2a, b, FIGS. 4a & 4b show an atomization device for producing a liquid-air mixture comprising liquid droplets, FIG. 5 shows a circuit variant when operating a gas-turbine plant, FIG. 6 shows an atomization device for producing a liquid-air mixture which comprises a foam-like mixture, FIG. 7 shows a table which compiles physical operating parameters for the atomization operation for producing a foam-like mixture, FIGS. 8a to d show graphs illustrating physical functional sequences as obtained when carrying out the atomization using the operating parameters shown in FIG. 7, FIGS. 9a, b show exemplary embodiments of a Laval nozzle for compressing a foam-like mixture, and FIG. 10 shows a further exemplary embodiment for an atomization device for producing a foam-like mixture.

DESCRIPTION OF THE PREFERRED EMBODIMENTS

Referring now to the drawings, wherein like reference numerals designate identical or corresponding parts throughout the several views, FIG. 1 shows a diagrammatic view of a gas-turbine plant which uses isothermal compression for precompression. Water, which is supplied to an atomization device 2 either from a water reservoir which is situated at a high level or, as in the example illustrated in FIG. 1, by means of a water pump 1, under pressure, is atomized with the aid of suitable outlet nozzles of the atomization device 2, in the nozzle inlet area of a Laval nozzle 3, to form a liquid-air mixture 4 which contains extremely finely dispersed, small liquid droplets. The Laval nozzle 3 illustrated in the exemplary embodiment shown in FIG. 1 is designed as a vertically arranged chute through which the liquid-air mixture 4 falls vertically downward, accelerated by the force of gravity. The narrowing internal contour of the Laval nozzle 3 withdraws kinetic energy from the liquid droplets which are falling vertically downward, with the result that the air contained in the liquid-air mixture 4 is compressed. On the downstream side, the Laval nozzle 3 is connected to a high-pressure chamber 5, in which the highly compressed air is separated from the liquid. Via a suitable high-pressure feed line 6, the isothermally precompressed air is fed to a further compressor stage 7, which is subsequently connected to a combustion chamber 8, in which the precompressed air, which has been mixed with fuel, is ignited. The hot gases which expand in the combustion chamber drive the turbine 9, which for its part is connected to a generator 10 for producing current.

In principle, it should be recorded that the length of the Laval nozzle 3 which is required for the compression is dependent not on the capacity of the gas turbine, but rather, to a very considerable extent, on the atomization quality with which the atomization device 2 atomizes the liquid to form extremely finely dispersed liquid droplets. The length of the Laval nozzle is also dependent on the nozzle efficiency and on the pressure at which the liquid to be atomized is fed to the atomization device 2. Thus the length of the Laval nozzle arrangement decreases as the droplet diameter decreases or the compression efficiency decreases. Typical nozzle lengths with a moderate atomization quality are approx. 20 m, whereas with a high atomization quality nozzle lengths can be reduced to 6 to 10 m. When a gas turbine with an air mass flow rate of approx. 400 kg per second is used, typical inlet nozzle openings for Laval nozzles are approx. 2 m, with outlet diameters of about 3 m. In principle, it is also possible to combine gas turbines, steam turbines and off-gas recuperators together with the isothermal compression. Furthermore, it can be stated that the use of the isothermal compression leads to a considerable increase in the power density and the efficiency of gas turbines, compared with systems with single-stage cooling.

The table shown in FIG. 2, in combination with the diagrams from FIGS. 3a to 3d, is to illustrate physical relationships which make it possible to optimize atomization devices. FIGS. 2a and b list starting parameters, respectively corresponding to two separate operating conditions under which in each case one atomization device has been operated. The following parameter abbreviations are to correspond to the following operating parameters:

| | |
|---|---|
| IP | Pressure in Pascals, at which the liquid is fed to the atomization device |
| DD | Droplet diameters which can be produced using the atomization device |
| TW | Water temperature in degrees C. |
| DW | Density of the water in kg/m³ |
| A | Acceleration due to gravity, in meters by seconds squared |
| G | Gas constant of air |
| MA | Air mass flow rate in kg per second |
| MW | Water mass flow rate in kg per second |
| IS | Flow speed of water after it emerges from the atomization device, in meters per second |
| E | Atomization efficiency |

Cases a and b from FIG. 2 essentially differ in that, in case a, a lower water-outlet speed was reached than in case b. Moreover, case b provides for a greater mass throughput of water through the atomization device than case a.

FIG. 3 shows four different diagrams a–d, the diagrams in the left-hand column corresponding to the method of operation of an atomization device which uses the starting parameters shown in FIG. 2*a,* while the diagrams in the right-hand column of FIG. 3 correspond to the starting parameters from Table 2b. In FIG. 3*a*, the height of the Laval nozzle in meters is plotted on the abscissa, while the pressure increase, in Pascal units, is plotted on the ordinate. In both cases, the pressure increases as the length of the Laval nozzle increases. In particular, it can be seen from the right-hand diagram in FIG. 3*b* that, despite a larger droplet diameter, there is no significant reduction in the compression action within the Laval nozzle. The inherently negative effect of the larger droplet diameter is in this case substantially compensated for by the considerably increased mass throughput of water through the Laval nozzle.

FIG. 3*b* shows the reduction in the speed of both the water component and the air component along the length of the nozzle, which is plotted in meters on the abscissa of the diagrams. The flow speeds in meters per second are plotted along the ordinate of the diagrams. In both cases, the flow speed of both the water component (W) and the air component (L) increase virtually in parallel.

In FIG. 3*c*, the height of the Laval nozzle in meters is again plotted on the abscissa, while the cross-sectional area of the Laval nozzle in square meters is plotted on the ordinate. Both diagrams represent the geometry of the internal contour through the Laval nozzle. It can be seen that within the narrowing inlet internal contour along the first 8 m, the liquid-air mixture which enters the nozzle at supersonic speed is decelerated to the subsonic range. If the internal geometric contour is compared with the reduction in the kinetic energy of the mass flows through the Laval nozzle shown in FIG. 3b, it can be seen from this comparison that the maximum deceleration effect of the Laval nozzle takes place in the first third of the length of the Laval nozzle.

FIG. 3d illustrates the volumetric ratio between water W and air L (plotted on the ordinate) with respect to the nozzle length (plotted on the abscissa). In both cases, it can be seen that the volumetric level of water increases as the length of the Laval nozzle increases. The model calculations assume a constant droplet size. In reality, droplets coagulate and, at relatively high volumetric levels of water (>approx. 10%), a transition to a foam-like mixture takes place. An increase in the size of the droplets temporarily leads to a reduced compression efficiency, while the transition to a foam-like mixture results in a considerable increase in the compression efficiency. This is particularly emphasized in the case of high water mass flow rates through the Laval nozzle, as illustrated by the right-hand column in FIG. 3d. Thus the water content W exceeds the air content L as early as after approximately 6 m.

In order to achieve as high a quality of water atomization as possible, i.e. in order to atomize water so as to form water droplets with the smallest possible diameter and with a spatially homogenous distribution, FIGS. 4a and b show a preferred atomization device which is suitable for forming a water-liquid mixture comprising liquid droplets. The right-hand part of FIG. 4a shows a plan view of the nozzle opening of the Laval nozzle 3, upstream of which there is an atomization device 2, comprising a multiplicity of concentrically arranged annular nozzles 11 which are in each case connected to one another by means of connection passages 12. The left-hand part of FIG. 4a shows a cross section through the arrangement of annular nozzles, which are each fed with water which leaves through the nozzle openings 13 of the annular nozzles 11.

Air L passes between the annular nozzles 11, in order to be mixed with the water W emerging from the nozzle openings 13. FIG. 4b shows a cross section through the arrangement of the atomization device 2 relative to the opening of the Laval nozzle 3. Annular nozzles 11, which form an homogenous spray mist comprising individual liquid droplets, are provided over the entire cross section of the nozzle opening of the Laval nozzle 3.

In addition to the atomization effect which is brought about by the atomization device, the level of atomization can also be increased by setting the temperature level of the liquid which is to be atomized in such a manner that the atomized liquid is partially evaporated just after it has passed through the atomization device. It is also possible to admix a second liquid with the water which is to be atomized before it passes through the atomization device, which second liquid, under the given pressure and temperature conditions, lies below its triple point; by way of example, $CO_2$ is recommended, which is in liquid form at temperatures of 35° C. and the high pressure conditions which prevail upstream of the atomization device. After it has passed through the atomization device, the liquid $CO_2$ exceeds its triple point, with the result that it sublimes and assists with the process of atomizing the water. In a particularly suitable manner, $CO_2$ can be removed from the off-gas after it has passed through the gas turbine 9 (cf. in this respect FIG. 5), and can be admixed with the liquid which is to be atomized with the aid of suitable off-gas feed lines 14.

As an alternative to atomizing liquid into the form of liquid droplets, FIG. 6 shows an atomization device which is used to produce air bubbles in liquid, which are then fed to a Laval nozzle 3. The right-hand part of FIG. 6 illustrates an atomization device 4 which is of largely identical design to the atomization device of FIG. 4. The atomization device 4 shown in FIG. 6 is likewise arranged in the nozzle entry area of the Laval nozzle 3. In contrast to the atomization device shown in FIG. 4, air L in this case passes through the atomization device 4, which is composed of individual annular nozzles 11 and connection passages 12, through the corresponding nozzle openings. Water W then enters the inlet area of the Laval nozzle 3 between the individual annular nozzles 11, resulting, by the injection of air into water, in a multiplicity of air bubbles which move through the Laval nozzle 3 at high speed in the form of a foam.

The question of whether a cloud of drops is formed first or a foam is formed immediately depends on the volume percentage of water and on the "Froude number", which is related to the pipe diameter. For volumetric levels of water which are greater than approximately 0.01, there is no possibility of a cloud of drops being maintained.

An overview of the mixing properties as a function of the "Froude number" and of the volumetric level of water is given in the study "Regime maps for air water two-phase flow" by P. L. Spedding and Van Thanh Nguyen, Chemical Engineering Science, Vol. 35, pp. 779–793, Pergamon Press Ltd., 1980.

At the (relatively high) volumetric levels of water which are under consideration here, a foam or bubble-containing water will always be formed sooner or later.

FIG. 7, like FIG. 2, shows tables compiling operating parameters which are typically used during the atomization of air in water. For interpretation of the operating parameters, reference is made to the curves shown in the diagrams of FIGS. 8a to d, which each give the length of the Laval nozzle in meters on their abscissa. In FIG. 8a, the pressure increase in hectopascals is plotted on the ordinate. FIG. 8b shows the mass ratio between the volumetric level of water W and that of air L along the Laval nozzle. It can be seen that the water content increases along the nozzle, whereas the air content decreases. A noticeable effect when carrying out isothermal compression with the aid of air bubbles is that the deceleration of the water mass flow and of the air mass flow takes place within the first third of the Laval nozzle. This can be seen from the diagram shown in FIG. 8c, in which the flow velocities of both phases are plotted on the ordinate. Within the first 10 m, both mass flow rates are decelerated to less than half the original kinetic energy, resulting in a considerable pressure increase. This is noticeable in particular in the diagram shown in FIG. 8d, in which the diameter of the Laval nozzle is plotted on the ordinate.

Since, in the case of a Laval nozzle through which a liquid-air mixture comprising air bubbles flows, most of the compression action takes place within the first few meters of the Laval nozzle, this nozzle may be of very compact and short design.

FIGS. 9a and b each show cross-sectional illustrations through a Laval nozzle, which are optimized for the passage of an air-bubble mixture. A bypass opening 15 ensures that the air-bubble flow is kept stable within the Laval nozzle. In particular, bypass opening 15 is configured in such a manner that the cross section of its passage opening can be controlled, in order to make it possible to adapt individually to the particular operating conditions. The bypass opening 15 serves as a start-up aid and is closed as soon as supersonic speed prevails in the entire area upstream of the constriction.

With the aid of the bleed valve 16, it is possible, in a controlled manner, to set a transition from the supersonic range to the subsonic range at the narrowest point of the Laval nozzle 3. It is particularly advantageous for the stability of the air-bubble mixture in the subsonic range if the static pressure of the droplet mixture can be controlled. Thus it is desired, in particular, to set a flow velocity which is just above the speed of sound at the narrowest area of the Laval nozzle, an effect which can be achieved by suitably correcting the static pressure. For this purpose, in accordance with FIG. 9b, bleed valves 16 are provided at the narrowest point of the Laval nozzle 3, the width of the openings of which valves can likewise be controlled. The bleed valve 16 also serves primarily as a start-up aid. If the back-pressure is too low, the flow would change back into the supersonic range and would ultimately be decelerated by a shock wave. If the back-pressure is too high, a shock wave would reach all the way to the mixer and would result in the failure of the entire compression process. The bleed valves offer protection against shock waves reaching as far as the mixer.

Finally, FIG. 10 shows a further embodiment of an atomization device in which air L flows through suitably shaped guide plates 17, which air sets Eulerian rotors 18, which are arranged rotatably in the direction of flow downstream of the air guide plates 17, in rotation (cf. arrow 19). From the individual rotor blades 20 of the Eulerian rotor 18, which are designed as nozzles, liquid, preferably water, is driven outwards under pressure, which water mixes in layers with the air which flows in between. With this configuration of an atomization device, it is likewise possible, with an extremely high level of efficiency, to produce a liquid-air mixture. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the isothermal compression of a compressible gas for the operation of a turbomachine which is intended to generate energy comprising the steps:
   atomizing a pressurized liquid with an atomization device; and
   forming a liquid-gas mixture with the atomized liquid and the gas;
   introducing the liquid-gas mixture into a nozzle arrangement in which most of the kinetic energy of the liquid-gas mixture is converted into compression energy as a result of increasing the gas pressure;
   wherein the step of introducing the liquid-gas mixture comprises introducing the liquid-gas mixture into the nozzle arrangement at a velocity which is greater than the speed of sound; and
   wherein the atomizing step comprising forming liquid droplets within the liquid-gas mixture, the diameters of which droplets are approx. 200 μm or less.

2. The method as claimed in claim 1, wherein the liquid, before passing through the atomization device, is at a temperature which is just above the evaporation temperature of the pressurized liquid.

3. The method as claimed in claim 1, further comprising the steps:
   mixing the liquid with a second liquid before passing through the atomization device to form a liquid-second liquid mixture, the mixing with the second liquid being performed at a pressure and a temperature such that the triple point of the second liquid is not exceeded;
   passing the liquid-second liquid mixture through the atomization device; and
   evaporating the second liquid by exceeding the triple point of the second liquid by a pressure drop.

4. The method as claimed in claim 3, wherein the step of mixing the liquid with a second liquid comprises mixing the liquid with $CO_2$ in liquid form.

5. The method as claimed in claim 4, further comprising obtaining the $CO_2$ for the step of mixing the liquid with a second liquid from off-gas from a combustion process.

6. The method as claimed in claim 1, wherein the step of atomizing the pressurized liquid with an atomization device comprises introducing the pressurized liquid at a pressure of between 10 bar and 30 bar.

7. The method as described in claim 1, wherein the step of atomizing comprises forming air bubbles surrounded by liquid inside the liquid-gas mixture.

8. The method as claimed in claim 7, wherein the diameter of the air bubbles which are present in the liquid is up to 25 mm.

9. The method as claimed in claim 1, wherein the step of atomizing comprises atomizing with a Laval nozzle as the nozzle arrangement.

10. The method as claimed in claim 1, wherein the compressible gas is air.

11. The method as claimed in claim 1, wherein the pressurized liquid is water.

12. An atomization device for producing a liquid-gas mixture useful for isothermal compression of a compressible gas for the operation of a turbomachine, comprising:
    a first annular nozzle and a second nozzle selected from the group consisting of a central nozzle and an annular nozzle, the first nozzle and the second nozzle being separated by a distance;
    at least one radial connection passage, wherein the first nozzle and the second nozzle are connected by the at least one radial connection passage to permit the exchange of a stream of matter.

13. The atomization device as claimed in claim 12, further comprising a plurality of annular nozzles provided concentrically with respect to one another, and further comprising a plurality of radial connection passages, each of the plurality of annular nozzles being connected to one another by the plurality of radial connection passages.

14. The atomization device as claimed in claim 12, further comprising a two-phase Laval nozzle positioned adjacent to the first and second nozzles and having an entry, wherein the cross-sectional area of the first nozzle and the second nozzle is approximately the same as the cross-sectional area at the entry of the two-phase Laval nozzle.

15. The atomization device as claimed in claim 12, further in combination with a two-phase Laval nozzle, and wherein the atomization device is arranged directly before the two-phase Laval nozzle.

16. The atomization device as claimed in claim 12, wherein the second nozzle is a central nozzle, and further comprising:
    a space between the first annular nozzle and the central nozzle;
    a source of liquid in fluid communication with the central nozzle and with the first annular nozzle; and
    a source of gas in fluid communication with the space between the central nozzle and the first annular nozzle.

17. The atomization device as claimed in claim 12, wherein the second nozzle is a central nozzle, and further comprising:

a space between the first annular nozzle and the central nozzle;

a source of gas in fluid communication with the central nozzle and with the first annular nozzle; and a source of liquid in fluid communication with the space between the central nozzle and the first annular nozzle.

18. A nozzle arrangement useful for compressing a liquid-air mixture when the liquid-air mixture flows downstream through the nozzle arrangement, the nozzle arrangement comprising:

a Laval nozzle having an opening into which the liquid-air mixture can at a flow velocity which is greater than the speed of sound;

a flow passage upstream of the Laval nozzle through which the liquid-air mixture can flow; and a bypass opening between the flow passage and the Laval nozzle positioned so that part of the liquid-air mixture can escape through the bypass opening.

19. The nozzle arrangement as claimed in claim 18, wherein the bypass opening is an annular passage which surrounds the opening of the Laval nozzle.

20. The nozzle arrangement as claimed in claim 18, wherein the bypass opening is configured to be controllably closed.

21. The nozzle arrangement as claimed in claim 18, further comprising a bleed-valve provided at the narrowest point of the cross-section of flow of the Laval nozzle, the valve arrangement affecting the static pressure within the liquid-air mixture flowing through the Laval nozzle when a liquid-air mixture flows through the Laval nozzle.

* * * * *